United States Patent [19]

Gall

[11] 4,015,057

[45] Mar. 29, 1977

[54] ABRASION RESISTANT FLUOROOLEFIN COATING COMPOSITION

[75] Inventor: Walter George Gall, Wilmington, Del.

[73] Assignee: E. I. Du Pont de Nemours and Company, Wilmington, Del.

[22] Filed: June 2, 1975

[21] Appl. No.: 582,793

Related U.S. Application Data

[63] Continuation-in-part of Ser. No. 415,665, Nov. 14, 1973, abandoned.

[52] U.S. Cl. .............................. 526/30; 260/32.8 R; 260/33.4 F; 260/827; 526/18; 526/48; 526/56
[51] Int. Cl.$^2$ ....................... C08K 5/05; C08K 5/07
[58] Field of Search ................. 260/32.8 R, 33.4 F, 260/78.4 D, 87.1, 87.5 A, 827, 78.5 CL; 526/18, 30, 48, 56

[56] References Cited

UNITED STATES PATENTS

| | | |
|---|---|---|
| 3,429,846 | 2/1969 | Bechtold et al. ................. 260/87.1 |
| 3,476,827 | 11/1969 | Engelhardt ....................... 260/87.1 |
| 3,514,425 | 5/1970 | Engelhardt ................... 260/87.5 A |
| 3,557,034 | 1/1971 | Thomas ......................... 260/87.5 A |
| 3,651,003 | 3/1972 | Bechtold .......................... 260/87.1 |
| 3,819,562 | 6/1974 | Cargagna ..................... 260/78.4 D |

*Primary Examiner*—Allan Lieberman

[57] ABSTRACT

A coating composition is provided which comprises a solution of an aliphatic carboxylic acid containing at least four carboxyl groups and a fluoroolefin copolymer containing pendant hydroxyl groups. The composition is useful for coating various substrates and after thermal curing, a crosslinked, abrasion resistant coating on the substrate is obtained.

5 Claims, No Drawings

ABRASION RESISTANT FLUOROOLEFIN COATING COMPOSITION

CROSS-REFERENCE TO RELATED APPLICATION

This is a continuation-in-part of a prior copending United States application Ser. No. 415,665, filed Nov. 14, 1973 and now abandoned.

FIELD OF THE INVENTION

This invention relates to coating compositions used to render substrates abrasion resistant, yet thermoformable. More specifically, the invention is directed to a coating composition comprising an aliphatic multicarboxylic acid having at least four carboxyl groups and a fluoroolefin copolymer containing pendant hydroxyl groups.

BACKGROUND OF THE INVENTION

Many compositions are known in the art which are useful for coating substrates to produce abrasion resistant products. In particular, substrates containing acrylic, e.g., polymethyl methacrylate, or polycarbonate polymers can be coated with an abrasion resistant coating of a mixture of a multihydroxy fluorocarbon polymer and a polysilicic acid. A more hydrolytically stable coating composition, as well as one that could be cured in a shorter time at lower temperatures, was needed and it was discovered that a coating composition of the multihydroxy fluorocarbon polymer and either citric or malonic acid or an acid ester thereof filled the above-described need. However, such coating compositions could be improved upon in their resistance to abrasion and in their resistance to attack by the action of various solvents such as methylene chloride, acetone, methyl ethyl ketone, chloroform, acetic acid, ethyl acetate and the like.

It has now been discovered that thermally cured coatings derived from a coating composition of a multihydroxy fluoroolefin copolymer and a multicarboxylic aliphatic acid characterized in that the acid contains at least four carboxyl groups and has at least a four carbon atom chain and in which the carbon chain may be interrupted by oxygen or sulfur atoms, show greater resistance to abrasion and most show greater resistance to attack by solvents, greater resistance to damage by hot water and better adhesion than the coating compositions described hereinabove.

SUMMARY OF THE INVENTION

According to the present invention there is provided a thermally curable coating composition comprising a solution in a compatible solvent of an esterification catalyst and I. an aliphatic carboxylic acid containing at least four carboxyl groups and having at least four carbon atoms in its chain and in which the carbon chain may be interrupted by oxygen or sulfur atoms, said acid being free of ester groups, and II. a fluoroolefin copolymer of a fluoroolefin of the formula $CFX = CX'X''$, wherein X is hydrogen or fluorine, $X'$ is hydrogen, fluorine or chlorine and $X''$ is hydrogen, chlorine, fluorine, lower perfluoroalkyl or lower perfluoroalkoxy, and a vinyl ether compound of the formula $CH_2 = CHOR$ wherein R is an alkyl or oxyalkyl group of up to 13 carbon atoms which contains at least one hydroxyl group, said fluoroolefin copolymer having a ratio of fluorine atoms to hydroxyl groups of between 1:1 and 22:1, said copolymer containing between about 6 and 65% by weight fluorine; wherein the amount of acid present in said solution is such that the number of carboxyl groups is at least about equal to the number of hydroxyl groups present in the copolymer.

DESCRIPTION OF THE INVENTION

The fluoroolefin copolymer contains pendant hydroxyl groups and representative fluoroolefins from which said fluoroolefin copolymer is derived include tetrafluoroethylene (which is preferred), trifluorochloroethylene, vinylidene fluoride, hexafluoropropylene, trifluoroethylene or vinyl fluoride, and the like.

Representative vinyl hydroxy-containing monomers or derivatives thereof for use in making the fluoroolefin copolymers include 4-hydroxybutyl vinyl ether; 3-hydroxybutyl vinyl ether; 2-hydroxyethyl vinyl ether; 3-hydroxypropyl vinyl ether; 5-hydroxypentyl vinyl ether; 6-hydroxyhexyl vinyl ether; diethylene glycol monovinyl ether, 2,3-dihydroxy propyl vinyl ether; 3-hydroxyl-2,2-dimethylpropyl vinyl ether; 2-methyl-2-hydroxymethyl-3-hydroxy propyl vinyl ether; 2-hydroxybutyl vinyl ether, and the like.

Copolymers of the aforementioned fluoroolefins and vinyl ethers may be prepared as described in Bechtold et al., U.S. Pat. No. 3,429,845. These fluoroolefin copolymers will contain a ratio of fluorine atoms to hydroxyl atoms of between about 1:1 to 22:1 and will contain between about 6 and 65% by weight fluorine. Preferably, the fluoroolefin copolymers have a number average molecular weight of between about 30,000 and about 80,000 and a weight average molecular weight of between about 350,000 and 550,000.

Preferably, the copolymer is a copolymer of $CFX = CX'X''$ wherein X is fluorine or hydrogen and $X'$ and $X''$ are defined as above and an omega hydroxyalkyl vinyl ether.

The multicarboxylic acid must be aliphatic, contain at least four carboxyl groups, and have at least four carbon atoms in its chain. Aromatic multicarboxylic acids do not provide the good properties provided by the aliphatic acids described herein. By the term "aliphatic" is meant an alkane or cycloalkane moiety, i.e., nonaromatic, which can be branched or unbranched. Preferably, the acid will contain between four and twelve carbon atoms (preferably up to six carbons). The alkane or cycloalkane moiety can be interrupted by oxygen or sulfur to result in an ether or its sulfur analog. Preferably any interrupted chain will be interrupted with oxygen. Representative acids include 2,3,4,5-tetrahydrofurantetracarboxylic acid; 1,2,3,4,-cyclopentanetetracarboxylic acid; 1,2,3,4-butanetetracarboxylic acid; 1,1,2,2-tetrakis(carboxymethylthio)ethane; 1,2,3,4-cyclohexanetetracarboxylic acid; 1,2,4,5-cyclohexanetetracarboxylic acid; 1,2,3,4,5-cyclopentanepentacarboxylic acid; tetrahydrothiophene-2,3,4,5-tetracarboxylic acid; hexahydromellitic acid; and the like.

The amount of the acid in the coating composition should be such that the number of carboxyl groups present is at least about equal to the number of pendant hydroxyl groups of the fluoroolefin copolymer. The number of carboxyl groups present can be as high as twice the number of pendant hydroxyl groups or more, but no particular advantage results from having more carboxyl groups than hydroxyl groups.

Preferably, for ease of application, the fluoroolefin copolymer and the acid are dissolved in a suitable compatible solvent, or compatible solvent mixture, which is substantially inert to the fluoroolefin copolymer and the aliphatic carboxylic acid. Suitable solvents include alcohols and ketones or mixtures thereof. Generally, secondary or tertiary alcohols are preferred as are di(-lower alkyl)ketones. The copolymer and the acid are ordinarily dissolved in the solvent or solvent mixture in an amount to provide a solids content of the solution of about 5 to 35% by weight. A solution viscosity of between about 10 and about 50 centipoises at 25° C. is suitable for most coating operations.

If desired, a leveling agent, such as an organosilicone, can be added to promote uniformity of application of the coating.

The coating solution composition is coated or sprayed onto a substrate or the substrate is dipped into the solution. The coating composition is suitable to coat many different kinds of substrates. Suitable substrates include wood, glass, polyesters such as polyethylene terephthalate, polyamides such as nylon, polycarbonates, polyacetals such as polyformaldehyde, polyvinyl chloride, polystyrene, polymethyl methacrylate, the ABS resins (blends of copolymers of acrylonitrile, butadiene and styrene). The coating thickness on the substrate can be varied by increasing the viscosity of the coating solution, or by repeated coating applications. Coating thickness may vary from 2 to 20µ or more.

The coated substrate can be cured by heating for between about 0.25 to 12 hours, preferably 2 to 5 hours, at between about 90° C. to 165° C., preferably between 100° C. and 135° C. Usually the freshly coated substrate is air dried for a short time, about 0.1 to 0.5 hour prior to curing at the elevated temperatures. During the curing the acid is believed to react with the pendant hydroxyl groups of the fluoroolefin copolymer to form a crosslinked composition containing polyester linkages. In order for this reaction to proceed quickly and at moderate elevated temperatures, it is usually desirable to include an esterification catalyst in the coating solution. Suitable catalysts include strong nonvolatile acids, such as p-toluenesulfonic acid, sulfuric acid, hydroxymethyl sulfonic acid, trifluromethanesulfonic acid, and the simple and chelated esters of orthotitanic acid. The amount of catalyst present may vary over a wide range, but generally 0.05 to 3% by weight is usually satisfactory.

The cured coatings on the substrates provide abrasion resistant surfaces. Such surfaces, when employed on clear substrates, are useful as windows, windshields, skylights, lenses, and the like.

The following Examples illustrate the invention, but are not meant to limit it. All percentages are by weight unless otherwise specified. Preceding the Examples is a description of the tests employed in the Examples.

TEST METHODS

Steel Wool Abrasion Resistance (SWAR hereinafter)

The sample to be tested is placed in an abrader device which consisted of a rotating foot (1 in.$^2$), a platform to support weight on and above the foot and a handle that permits the assembly to be rotated.

A pad of steel wool of sufficient size to cover the foot of the abrader about 1.2 inch in diameter and of uniform thickness is cut from a fresh roll of No. 0000 grade steel wool (such as Beaver Grade by James H. Rhodes & Co.). The pad is placed on the sample and attached to the foot. A known weight is placed on the platform above the foot to give a known pressure on the foot (1–10 kg./in.$^2$). This foot is rotated 5 revolutions at about 1 rev./sec.; the weight is removed from the platform and the sample and steel wool removed. The percent haze is then measured in the abraded area of the sample. The difference between the haze after abrasion minus the initial unabraded haze gives the delta ($\Delta$)% haze. The lower the $\Delta$ % haze the better the abrasion resistance.

Haze and Transparency (luminous transmittance)

Haze and luminous transmittance are determined by a Gardner Automatic Photometric Unit (ASTM D-1003-61).

Arizona Wet Wipe Test

The resistance of the coatings to abrasion by wet, granular abrasives is determined by abrading a 2 inch × 2 inch area of a test panel in a special wiping tester designed to operate at 60 strokes per minute.

The abrasive slurry is prepared by mixing equal weights of water and Air Cleaner Test Dust (such as fine grade obtained from the AC Spark Plug Division of General Motors Corporation). The resulting slurry is kept well mixed and used within eight hours of preparation. A pool of the abrasive slurry approximately two inches in diameter is poured onto the test area and wiped for 180 strokes (3 minutes) with a water-saturated felt pad wrapped around the curved surface of a 2 inches diameter cylindrical mandrel two inches wide loaded to a total of 500 g. The wiping pressure is about 1 psi. The degree of abrasion is determined by measuring the change in transmitted haze ($\Delta$ % H) resulting from the wiping.

Halloween Test

A thin layer of Fels-Naphtha soap is smeared onto one side of a coated panel and the panel kept for 16 hours in a room of about 100% relative humidity. The test subjects the sample to a mild alkaline exposure.

Adhesion Measurement

Adhesion is measured by the following procedures:
1. Scratch a 9-square (3 line) rectangular grid in approximately a ½ inch area through coating.
2. Scour with No. 0000 steel wool to remove surface debris.
3. Using a transparent tape (Scotch Brand Transparent Tape No. 600), the tape is firmly pressed onto the grid and removed by a quick pull, keeping the tape at about 90 degrees to the panel surface.
4. Repeat (3) twice.
5. Examine the grid carefully and rate as follows:

| Result | Rating |
| --- | --- |
| All coating removed | 0% — Poor |
| 1 Square remaining | 10% — Poor |
| 5 Squares remaining | 50% — Good |
| 9 Squares remaining but chip-back at edges of grid lines | 90% — Excellent |
| No chip-back of any kind | 100% — Excellent |

Coating Thickness

This was determined by an interferometric technique as described by:

M. F. Bechtold, Journal of the Optical Society of America, 37, (1947), pp. 873–878.

EXAMPLE 1

The following coating solutions were prepared by mixing:

| 1A | 1B (Comparative) | |
|---|---|---|
| 5.4 g | — | 2,3,4,5-Tetrahydrofuran-tetracarboxylic Acid |
| — | 5.4 g | Citric Acid |
| 12.4 g | 12.4 g | n-Butanol |
| 50.4 g | 50.4 g | Methyl Isobutyl Ketone |
| 3.0 g | 3.0 g | 10% L-520 Silicone leveling agent (an organosilicone which is a block copolymer of one or more lower alkylene oxides with dimethyl siloxane) in isopropanol |
| 2.0 g | 2.0 g | 20% p-Toluenesulfonic Acid in isopropanol |
| 126.8 g | 126.8 g | 11% Solution of 1:1 tetrafluoroethylene/4-hydroxybutyl vinyl ether copolymer in butanol |

Approximately 0.2 to 0.4 g of the 1A solids remained undissolved and were separated by filtration. Five 4 inches × 4 inches × 3/16 inch commercially available polymethyl methacrylate panels ("Plexiglas" G) were dip coated with each solution at a withdrawal rate of 35 inches/minute. All coated panels were air dried at room temperature and cured in a circulating air oven for 2 hours at 135° C. Transparency and haze were good. Testing of these panels yielded the following results:

| | 1A | 1B (Comparative) |
|---|---|---|
| Coating Thickness (μ) | 3.0 | 3.4 |
| Steel Wool Abrasion Resistance (SWAR), 5 kg, ΔH(%) | 1.7 | 2.5 |
| Steel Wool Abrasion Resistance, 10 kg, ΔH(%) | 2.1 | 6.5 |
| Arizona Wet Wipe Test, ΔH(%) | 0.5 | 0.6 |
| Adhesion (%) | 100 | 100 |

The tetracarboxylic acid-containing coating (1A) showed much better abrasion resistance than the tricarboxylic acid test or both SWAR tests and somewhat better resistance on the Arizona wet wipe test despite the fact that the 1A coating was not sufficiently thick for optimum abrasion resistance. The 1B coating was somewhat more abrasion resistant after subjection to mild alkali (the Halloween Test, followed by SWAR Test), but after immersion for 66 hours in 60° water, the 1B coating had lost a great deal of its adhesion to the substrate.

EXAMPLE 2

Part A

The following coating solutions were prepared by mixing the following ingredients together:

| 2A | 2B | 2C | |
|---|---|---|---|
| 28.9 g | — | — | 2,3,4,5-Tetrahydrofurantetracarboxylic Acid |
| — | 28.7 g | — | 1,2,3,4-Cyclopentanetetracarboxylic Acid |
| — | — | 27.3 g | 1,2,3,4-Butanetetracarboxylic Acid |
| 74.4 g | 74.4 g | 74.4 g | sec.-Butanol |
| 302.4 g | 302.4 g | 302.4 g | Acetone |
| 18 g | 18 g | 18 g | 10% L-520 Silicone in isopropanol |
| 12 g | 12 g | 12 g | 20% p-Toluenesulfonic Acid in isopropanol |
| 761 g | 761 g | 761 g | 11% Solution of 1:1 tetrafluoroethylene/4-hydroxybutyl vinyl ether copolymer in butanol |

Only the 2A solution was cloudy and was filtered before use. Three 6 inches × 12 inches × 3/16 inch commercially available polymethyl methacrylate ("Plexiglas" G) panels were dip coated with each solution at a withdrawal rate of 35 inches/min., air dried at room temperature for 25 minutes and then cured for 6 hours in a 135° C. circulating air oven. Transparency and haze were good. Tests of these panels yielded the following results:

| | 2A | 2B | 2C |
|---|---|---|---|
| Steel Wool Abrasion Resistance, 5 kg, ΔH(%) | 0.5 | 0.7 | 0 |
| Steel Wool Abrasion Resistance, 10 kg, ΔH(%) | 1.7 | 2.2 | 0.8 |
| Arizona Wet Wipe Test, ΔH(%) | 0.5 | 0.5 | 0 |
| Exposure to 60° H₂O/2 Hrs. followed by SWAR, 5 kg, ΔH(%) | 0.7 | 0.4 | 0.4 |
| Exposure to 60° $H_2O$/2 Hrs. followed by SWAR, 10 kg, ΔH(%) | 1.6 | 1.7 | 1.1 |
| Halloween Test followed by SWAR, 5 kg, ΔH(%) | 1.1 | 1.0 | 0.3 |
| Halloween Test followed by SWAR, 10 kg, ΔH(%) | 2.0 | 1.6 | 1.1 |
| Adhesion (%) | 100 | 100 | 100 |

These results show good abrasion resistance in all three tetracarboxylic acid-containing coatings tested. The results also show, along with the results of Example 1, that when the amount of the fluoroolefin copolymer is increased when the acid is tetrahydrofurantetracarboxylic acid, abrasion resistance remains good even after subjecting the coating sample to mild alkali (the Halloween Test).

Part B

The panels coated in Part A were exposed to various solvents for the times indicated below with the results shown.

| Exposure Time | Solvent | 2A | 2B | 2C |
|---|---|---|---|---|
| 10 min. | Methylene Chloride | attacked | very slightly attacked | no attack |
| 10 min. | Acetone | no attack | no attack | trace of attack |
| 1 hour | Chloroform | trace of attack | no attack | no attack |
| 1 hour | Methyl | no | no | no |

| Exposure Time | Solvent | 2A | 2B | 2C |
|---|---|---|---|---|
| | Ethyl Ketone | attack | attack | attack |
| 1 hour | Acetic Acid | no attack | no attack | no attack |
| 1 hour | Ethyl Acetate | no attack | no attack | no attack |

The excellent resistance to strong solvents exhibited by all three of the above coatings is to be contrasted with the much poorer solvent resistance shown by the tricarboxylic acid coatings described as follows:

The following comparative coating solutions were prepared:

| 2D | 2E | |
|---|---|---|
| 4.55 g | — | 1,2,3-propanetricarboxylic Acid |
| — | 4.95 g | Citric Acid |
| 12.4 g | 12.4 g | sec.-Butanol |
| 50.4 g | 50.4 g | acetone |
| 3.0 g | 3.0 g | 10% L-520 Silicone in Isopropanol |
| 2.0 g | 2.0 g | 20% p-Toluenesulfonic Acid in Isopropanol |
| 126.8 g | 126.8 g | 11% Tetrafluorethylene/ 4-Hydroxybutyl Vinyl Ether 1:1 Copolymer in Butanol |

4 inches × 4 inches × 3/16 inch Polyacrylic panels were dip coated with each solution at a withdrawal rate of 35 inches/min., air dried at room temperature for 20 minutes and then cured in a circulating air oven for 4 hours at 135° C.

The coated panels were exposed to various solvents for the times indicated with the results shown.

| Exposure Time | Solvent | 2D | 2E |
|---|---|---|---|
| 10 min | Methylene Chloride | attacked very slightly | attacked very slightly |
| 10 min | Acetone | attacked strongly | attacked strongly |
| 1 hour | chloroform | attacked slightly | attacked slightly |
| 1 hour | Methyl Ethyl Ketone | attacked slightly | attacked very slightly |
| 1 hour | Acetic Acid | attacked slightly | attacked slightly |
| 1 hour | Ethyl Acetate | attacked | attacked |

It is seen that the coated panels containing coatings of this invention are much more resistant to attack by the solvents listed above.

EXAMPLE 3

The following coating solutions were prepared:

| 3A | 3B (Comparative) | |
|---|---|---|
| 35.4 g | — | 1,1,2,2-Tetrakis (carboxymethylthio) ethane |
| — | 25.0 g | Propanetricarboxylic Acid |
| 74.4 g | 74.4 g | sec.-Butanol |
| 302.4 g | 302.4 g | Acetone |
| 18 g | 18 g | 10% L-520 Silicone in Isopropanol |
| 12 g | 12 g | 20% p-Toluenesulfonic Acid in Isopropanol |
| 761 g | 761 g | 11% Tetrafluoroethylene/ 4-Hydroxybutyl Vinyl Ether 1:1 Copolymer in Butanol |

Sample 3A had a COOH/OH ratio of about 1.2 while sample 3B had a COOH/OH ratio of about 1.1. Sample 3A was filtered prior to coating.

Three 6 inches × 12 inches × 3/16 inch polymethyl methacrylate panels (Plexiglas G) were dip coated with each solution at a withdrawal rate of 35 inches/min., air dried at room temperature for 20 minutes and then cured in a circulating air oven for 2.5 hours at 135° C. Transparency and haze were good. Tests of these panels yielded the following results:

| | 3A | 3B (Comparative) |
|---|---|---|
| Steel Wool Abrasion Resistance, 5 kg, ΔH(%) | 3.2 | 3.0 |
| Steel Wool Abrasion Resistance, 10 kg, ΔH(%) | 5.0 | 10.2 |
| Arizona Wet Wipe Test, ΔH(%) | 0.5 | 1.8 |
| Exposure to 60° H$_2$O/2 Hrs. followed by SWAR, 5 kg, ΔH(%) | 2.0 | 3.2 |
| Exposure to 60° H$_2$O/2 Hrs. followed by SWAR, 10 kg, ΔH(%) | 2.6 | 7.4 |
| Halloween Test followed by SWAR, 5 kg, ΔH(%) | 2.0 | 3.4 |
| Halloween Test followed by SWAR, 10 kg, ΔH(%) | 3.8 | 9.3 |
| Adhesion (%) | 100 | 100 |

These results show the generally much greater abrasion resistance in the coating covered by this invention (3A) over the coating outside this invention (3B).

Resistance of the coatings 3A and 3B to solvents was about the same.

EXAMPLE 4

The following coating solutions were prepared:

| 4A | 4B (Comparative) | |
|---|---|---|
| 6.1 g | — | 1,2,3,4-Butanetetracarboxylic Acid |
| — | 9.0 g | Citric Acid |
| 58.58 g | 75.6 g | Methyl Isobutyl Ketone |
| 58.6 g | 76.4 g | sec.-Butanol |
| 4.6 g | 6.0 g | 10% L-520 Silicone in Isopropanol |
| 2.3 g | 3.0 g | 20% p-Toluenesulfonic Acid in Isopropanol |
| 102.4 g | 130 g | 16.77% Tetrafluoroethylene/ 3-Hydroxypropyl Vinyl Ether 1:1 Copolymer in Butanol |

Although the recipes are superficially different, they are actually closely comparable with 0.20% each of p-toluenesulfonic acid and L-520 in each coating solution, 7.33% ± 0.07% copolymer in each, 2.8 ± 0.2% polycarboxylic acid in each, 25.1% ± 0.1% methyl isobutyl ketone in each and 61.77% ± 0.23% butanols in each coating solution. However, because of the equivalent weight difference the COOH/OH ratio of 4A was 1.20 while 4B had a COOH/OH ratio of 1.30.

Polymethyl methacrylate panels (Plexiglas G) were dip coated with each solution at a withdrawal rate of 35 inches/min., air dried at room temperature for ten minutes and then cured in a circulating air oven for 3 hours at 135° C. Appearance of both products was good. Tests of these panels yielded the following results:

|  | 4A | 4B (Comparative) |
|---|---|---|
| Steel Wool Abrasion Resistance, 5 kg, Δ%H | 1.3 | 2.5 |
| Steel Wool Abrasion Resistance, 10 kg, Δ%H | 1.3 | 2.4 |
| Exposure to 60° H$_2$O/2 hrs. followed by SWAR, 5 kg, Δ%H | 2.1 | — |
| Exposure to 60° H$_2$O/2 hrs. followed by SWAR, 10 kg, Δ%H | 3.4 | — |
| Adhesion, Dry, % | 100 | 0 |
| Adhesion, After 60° H$_2$O/2 hrs. exposure, % | 100 | 0 |

These results show not only the much greater abrasion resistance of the coating covered by this invention (4A) but also the much superior adhesion to polymethyl methacrylate of this coating as compared with the coating outside this invention (4B).

EXAMPLE 5

The following coating solutions were prepared:

| 5A | 5B | |
|---|---|---|
| 7.4 g | 6.5 g | 1,2,3,4-Butanetetracarboxylic Acid |
| 78 g | 72 g | Methyl Isobutyl Ketone |
| 70 g | 40.7 g | sec.-Butanol |
| 6.2 g | 5.8 g | 10% L-520 Silicone in Isopropanol |
| 3.1 g | 2.9 g | 20% p-toluenesulfonic Acid in Isopropanol |
| 147.4 g | — | 16.16% Tetrafluoroethylene/5-Hydroxypentyl Vinyl Ether 1:1 Copolymer in Butanol |
| — | 160 g | 13.94% Tetrafluoroethylene/6-Hydroxyhexyl Vinyl Ether 1:1 Copolymer in Butanol |

The COOH/OH ratio was 1.20 in each case. Polymethyl methacrylate (Plexiglas G) panels were dip coated with each solution at a withdrawal rate of 35 inches/min., air dried at room temperature for 10 minutes and then cured in a circulating air oven for 6 hours at 100° C. Appearance of both products was good. Tests of these panels yielded the following results:

|  | 5A | 5B |
|---|---|---|
| Steel Wool Abrasion Resistance, 5 kg, Δ%H | 2.1 | 3.2 |
| Steel Wool Abrasion Resistance, 10 kg, Δ %H | 3.4 | 5.9 |
| Exposure to 60° H$_2$O/2 hrs. followed by SWAR, 5 kg, Δ%H | 4.1 | 5.5 |
| Exposure to 60°H$_2$O/2 hrs. followed by SWAR, 10 kg, Δ%H | 12.2 | 10.8 |
| Adhesion, Dry, % | 100 | 100 |
| Adhesion, After 60° H$_2$O/2 hrs. exposure, % | 0/40 | 100 |

For comparative purposes, the Steel Wool Abrasion Resistance (10 kg) Δ %H of uncoated Plexiglass G is about 25.

The above results show good abrasion resistance and adhesion of the coatings but only marginal hot water resistance as compared with the coatings from the more preferred hydroxyalkyl vinyl ethers of Examples 1–4 under the conditions employed. The next two examples demonstrate that, under other conditions, the hot water resistance of coatings from both these copolymers can be improved substantially.

EXAMPLE 6

The following coating solutions were prepared:

| 6A | 6B (Comparative) | |
|---|---|---|
| 7.4 g | — | 1,2,3,4-Butanetetracarboxylic Acid |
| — | 8.8 g | Citric Acid |
| 78 g | 75.6 g | Methyl Isobutyl Ketone |
| 70 g | 55.6 g | sec.-Butanol |
| 6.2 g | 6.0 g | 10% L-520 Silicone in Isopropanol |
| 3.1 g | 3.0 g | 20% p-toluenesulfonic Acid in Isopropanol |
| 147.4 g | 151 g | 16.16% Tetrafluoroethylene/5-Hydroxypentyl Vinyl Ether 1:1 Copolymer in Butanol |

Again, these recipes are closely comparable, with 0.20% each of p-toluenesulfonic acid and L-520 in each coating solution and a COOH/OH ratio of 1.20 in 6A and 1.30 in 6B.

Sheffield polycarbonate panels were dip coated with each solution at a withdrawal rate of 35 inches/min., air dried at room temperature for 10 minutes and then cured in a circulating air oven for 3 hours at 135° C. Appearance of both products was good and tests yielded the following results:

|  | 6A | 6B (Comparative) |
|---|---|---|
| Steel Wool Abrasion Resistance, 5 kg, Δ%H | 3.6 | 5.4 |
| Steel Wool Abrasion Resistance, 10 kg, Δ%H | 4.1 | 7.0 |
| Exposure to 60° H$_2$O/2 hrs. followed by SWAR, 5 kg, Δ%H | 5.0 | — |
| Exposure to 60° H$_2$O/2 hrs. followed by SWAR, 10 kg, Δ%H | 5.6 | — |
| Adhesion, Dry, % | 100 | 100 |
| Adhesion, After 60° H$_2$O/2 hrs. exposure, % | 100 | 0/100 |

The above results show better abrasion resistance, hot water resistance and adhesion to polycarbonate of the coating covered by this invention (6A) as compared with the coating outside this invention (6B). While the abrasion after hot water exposure of 6B was not tested, it was expected to be poor because of the variable, marginal adhesion (0 and 100%) of different areas of the panel.

EXAMPLE 7

The following coating solutions were prepared:

| 7A | 7B (Comparative) | |
|---|---|---|
| 6.5 g | — | 1,2,3,4-Butanetetracarboxylic Acid |
| — | 7.6 g | Citric Acid |
| 72 g | 75.6 g | Methyl Isobutyl Ketone |

-continued

| | 7A | 7B (Comparative) | |
|---|---|---|---|
| | 40.7 g | 47.8 g | sec.-Butanol |
| | 5.8 g | 6.0 g | 10% L-520 Silicone in Isopropanol |
| | 2.9 g | 3.0 g | 20% p-toluenesulfonic Acid in Isopropanol |
| | 160 g | 160 g | 13.94% Tetrafluoroethylene/ 6-Hydroxyhexyl Vinyl Ether 1:1 Copolymer in Butanol |

Again, these recipes are closely comparable with 0.20% each of p-toluenesulfonic acid and L-520 in each coating solution, 7.59% ± 0.16% copolymer in each, 2.4% ± 0.14% polycarboxylic acid in each, 25.1% ± 0.1% methyl isobutyl ketone in each and 61.9% ± 0.07% butanols in each coating solution. The COOH-/OH ratio of 7A was 1.20 while that of 7B was 1.30.

Sheffield polycarbonate panels were dip coated with each solution at a withdrawal rate of 35 inches/min., air dried at room temperature for 10 minutes and then cured in a circulating air oven for 6 hours at 100° C. Appearance of both products was good and tests yielded the following results:

| | 7A | 7B (Comparative) |
|---|---|---|
| Steel Wool Abrasion Resistance, 5 kg, Δ %H | 5.8 | 7.4 |
| Steel Wool Abrasion Resistance, 10 kg, Δ %H | 6.1 | 11.0 |
| Exposure to 60° H$_2$O/2 hrs. followed by SWAR, 5 kg, Δ %H | 4.0 | 6.1 |
| Exposure to 60° H$_2$O/2 hrs. followed by SWAR, 10 kg, Δ %H | 5.7 | 9.1 |
| Adhesion, Dry, % | 100 | 100 |
| Adhesion, After 60° H$_2$O/2 hrs. exposure, % | 100 | 70/100 |

These results shown better abrasion resistance, hot water resistance and adhesion to polycarbonate of the coating covered by this invention (7A) as compared with the coating outside this invention (7B).

EXAMPLE 8

Sheffield polycarbonate panels were dip coated with coating solutions 7A and 7B at a withdrawal rate of 35 inches/min., air dried at room temperature for 10 minutes and then cured in a circulating air oven for 3 hours at 135° C., labeling them 8A and 8B, respectively. Appearance of both products was good and tests yielded the following results:

| | 8A | 8B (Comparative) |
|---|---|---|
| Steel Wool Abrasion Resistance, 5 kg, Δ%H | 3.9 | 4.4 |
| Steel Wool Abrasion Resistance, 10 kg, Δ%H | 5.9 | 8.3 |
| Exposure to 60° H$_2$O/2 hrs. followed by SWAR, 5 kg, Δ%H | 5.4 | — |
| Exposure to 60° H$_2$O/2 hrs. followed by SWAR, 10 kg, Δ%H | 5.9 | — |
| Adhesion, Dry, % | 100 | 100 |
| Adhesion, After 60° H$_2$O/2 hrs. exposure, % | 100 | 0/100 |

These results demonstrate that the better properties of the coating covered by this invention (8A) persist even when the curing conditions are changed substantially from those employed in the preceding example.

The embodiments of the invention which an exclusive property or privilege is claimed are defined as follows:

1. A thermally curable coating composition comprising a solution in a compatible solvent of an esterification catalyst and
   I. an aliphatic carboxylic acid containing at least four carboxyl groups and having at least four carbon atoms in its chain and in which the carbon chain may be interrupted by oxygen or sulfur atoms, said acid being free of ester groups, and
   II. a fluoroolefin copolymer of the fluoroolefin of the formula $CFX = CX'X''$, wherein X is hydrogen or fluorine, X' is hydrogen, fluorine or chlorine and X'' is hydrogen, chlorine, fluorine, lower perfluoroalkyl or lower perfluoroalkoxy, and a vinyl ether compound of the formula $CH_2 = CHOR$ wherein R is an alkyl or oxyalkyl group of up to 13 carbon atoms which contains at least one hydroxyl group, said fluoroolefin copolymer having a ratio of fluorine atoms to hydroxyl groups of between 1:1 and 22:1, said copolymer containing between about 6 and about 65% by weight fluorine and having a number average molecular weight of about from 30,000 to 80,000 and a weight average molecular weight of about from 350,000 to 550,000;
   wherein the amount of acid present in said solution is such that the number of carboxylic groups is at least about equal to and as high as about twice the number of hydroxyl groups present in the copolymer wherein the copolymer and the acid are dissolved in the solvent or solvent mixture in an amount sufficient to provide a solution viscosity which is suitable for coating operations and wherein the solvent is substantially inert to the fluoroolefin copolymer and the aliphatic carboxylic acid.

2. The thermally curable coating composition of claim 1 wherein said aliphatic carboxylic acid contains four to twelve carbon atoms and is a tetracarboxylic acid.

3. The thermally curable coating composition of claim 2 wherein said vinyl compound is an omega hydroxy alkyl vinyl ether.

4. The thermally curable coating composition of claim 3 wherein the aliphatic carboxylic acid is 1,2,3,4-butanetetracarboxylic acid and said vinyl compound is 4-hydroxybutyl vinyl ether.

5. The thermally curable coating composition of claim 4 in which the catalyst is a strong nonvolatile acid selected from the class consisting of paratoluene sulfonic acid, sulfuric acid, hydroxy methyl sulfonic acid, trifluoromethane-sulfonic acid and simple and chelated esters of orthotitanic acid.

* * * * *